(12) United States Patent
Wetmore

(10) Patent No.: US 7,079,012 B2
(45) Date of Patent: Jul. 18, 2006

(54) SYSTEM AND METHOD FOR DISTRIBUTING BROADBAND COMMUNICATION SIGNALS OVER POWER LINES

(76) Inventor: Evans Wetmore, 1609 Fifth St., Manhattan Beach, CA (US) 90266

( * ) Notice: Subject to any disclaimer, the term of this patent is extended or adjusted under 35 U.S.C. 154(b) by 0 days.

(21) Appl. No.: 10/763,054

(22) Filed: Jan. 21, 2004

(65) Prior Publication Data

US 2005/0157442 A1 Jul. 21, 2005

(51) Int. Cl.
*G05B 11/01* (2006.01)
(52) U.S. Cl. ............................ 340/310.11; 340/310.13; 340/870.31
(58) Field of Classification Search ........... 340/310.01, 340/310.05, 310.06, 310.07, 854.8, 870.31, 340/310.13, 310.17; 375/258, 259; 333/131, 333/177
See application file for complete search history.

(56) References Cited

U.S. PATENT DOCUMENTS

| | | | | |
|---|---|---|---|---|
| 3,946,279 A | * | 3/1976 | Paice et al. ................ 361/42 |
| 3,974,404 A | | 8/1976 | Davis .......................... 307/303 |
| 4,021,797 A | | 5/1977 | Hofmeister ................. 340/310 |
| 4,130,861 A | * | 12/1978 | LaForest ..................... 363/39 |
| 4,302,750 A | * | 11/1981 | Wadhwani et al. ..... 340/870.02 |
| 4,510,611 A | | 4/1985 | Dougherty .................... 375/8 |
| 4,635,296 A | * | 1/1987 | Dinsmore .................. 455/113 |
| 5,210,518 A | * | 5/1993 | Graham et al. ............. 375/351 |
| 5,349,666 A | | 9/1994 | Adachi et al. .............. 395/750 |
| 5,485,040 A | | 1/1996 | Sutterlin ....................... 307/3 |
| 5,694,108 A | * | 12/1997 | Shuey ................... 340/310.01 |
| 5,818,127 A | | 10/1998 | Abraham .................... 307/106 |
| 5,929,749 A | | 7/1999 | Slonim et al. ......... 340/310.01 |
| 5,970,138 A | | 10/1999 | Suda et al. ................. 379/412 |
| 5,977,650 A | | 11/1999 | Rickard et al. ............... 307/3 |
| 6,037,678 A | | 3/2000 | Rickard ....................... 307/89 |
| 6,144,290 A | | 11/2000 | Duval et al. ........... 340/310.01 |
| 6,313,738 B1 | * | 11/2001 | Wynn ........................... 307/3 |
| 6,396,392 B1 | * | 5/2002 | Abraham .............. 340/310.01 |
| 6,407,987 B1 | | 6/2002 | Abraham .................... 370/295 |
| 6,441,723 B1 | | 8/2002 | Mansfield, Jr. et al. . 340/310.01 |
| 6,496,104 B1 | | 12/2002 | Kline .................... 340/310.01 |
| 6,504,402 B1 | | 1/2003 | Horiguchi et al. .......... 326/121 |
| 6,515,485 B1 | | 2/2003 | Bullock et al. ............. 324/601 |
| 6,522,626 B1 | | 2/2003 | Greenwood ................. 370/208 |
| 6,549,120 B1 | | 4/2003 | de Buda ................ 340/310.01 |
| 6,559,757 B1 | * | 5/2003 | Deller et al. .......... 340/310.01 |
| 6,686,832 B1 | * | 2/2004 | Abraham .............. 340/310.01 |
| 2003/0006881 A | | 1/1903 | Reyes ................... 340/310.01 |
| 2003/0071719 A | | 4/1903 | Crenshaw et al. ..... 340/310.01 |
| 2003/0179080 A | | 9/1903 | Mollenkopf et al. ... 340/310.01 |
| 2003/0190110 A | | 10/1903 | Kline ........................... 385/15 |
| 2002/0024423 A1 | | 2/2002 | Kline .................... 340/310.01 |
| 2002/0109585 A1 | | 8/2002 | Sanderson ............. 340/310.01 |
| 2003/0039317 A1 | | 2/2003 | Taylor et al. ............... 375/295 |
| 2003/0071721 A1 | | 4/2003 | Manis et al. ........... 340/310.03 |
| 2003/0095036 A1 | | 5/2003 | Wasaki et al. ......... 340/310.01 |
| 2003/0133473 A1 | | 7/2003 | Manis et al. ................ 370/480 |
| 2003/0137405 A1 | | 7/2003 | Kaku et al. ............ 340/310.01 |
| 2003/0156012 A1 | | 8/2003 | Omidi et al. .......... 340/310.01 |
| 2003/0156014 A1 | | 8/2003 | Kodama et al. ....... 340/310.01 |
| 2003/0160684 A1 | | 8/2003 | Cern ..................... 340/310.01 |

* cited by examiner

*Primary Examiner*—John Tweel, Jr.
(74) *Attorney, Agent, or Firm*—Sofer & Haroun, LLP

(57) ABSTRACT

The present invention is directed to a method for decreasing high frequency (HF) radiation emission in a power line. The method involves transmitting a utility power signal over the power line and transmitting a high frequency communication signal over the power line so as to provide a combined utility and high frequency signal over the power line. A plurality of inductors are provided, disposed along the power line.

12 Claims, 3 Drawing Sheets

SYSTEM AND METHOD FOR DISTRIBUTING BROADBAND COMMUNICATION SIGNALS OVER POWER LINES

FIELD OF THE INVENTION

This invention relates to data communications, and more specifically to a broadband communication system employing power transmission lines.

BACKGROUND OF THE INVENTION

Within the past few years a new mode of communicating data has been accomplished by employing existing power cable or transmission lines. This mode of communications is referred to as broadband over power lines (BOPL). BOPL allows power utility companies to utilize their backbone electric grid infrastructure to offer their customers high speed telecommunications services. Thus, power utility companies can now provide continuous high speed Internet access by modest changes of their existing plant.

Broadband over power line technology employs building and/or overhead power lines to conduct HF and VHF digital signals for allowing computers to connect to the Internet. The FCC views this technology as a competitive Internet access point, and the utilities view the technology as a means to use existing infrastructure to generate additional revenue from something other than power generation and distribution.

One important concern about transmission of high frequency signals over power lines is electromagnetic radiation from the power lines into already used frequency channels. More specifically, for high frequency signals, the power line may act as an antenna that is able to emanate electromagnetic radiation leading to a significant interference to over-the-air radio services.

Under current FCC regulations, power transmission lines may emit signals having a power of up to 30 microvolts/meter at a distance of 30 meters from the source. However, such emission levels can easily interfere with other overlapping frequency channels, such as those used by Amateur Radio Service. The problem with such interference is that it affects not only the Amateur Radio community, but also those who employ radio services using High Frequency HF spectrum.

Thus, there is a need for an arrangement that can effectively overcome the problems arising from transmission of high frequency signals over power lines.

SUMMARY OF THE INVENTION

In accordance with one embodiment of the invention high frequency signals are carried over an electric utility power line. The high frequency signal maintains a constant signal power necessary for a satisfactory demodulation. The high frequency current signal, however, is reduced so as to reduce the radio frequency radiation emitted from the utility power line.

In accordance with another embodiment of the invention, a plurality of inductive loads are installed at selected locations along the utility power line. In accordance with another embodiment of the invention, the inductive loads are clamp-on inductors. In accordance with another embodiment of the invention, the inductive loads are connected in series with the utility line.

The inductors are chosen so that their reactance is negligible at the power line frequency, which is about 50 or 60 Hz, and their reactance is significant at High Frequency (HF) band.

In order for the power line to maintain the same signal power with the inductive loads as a power line without the inductive loads, the value of the voltage level of the transmitted signal is increased, while the value of the current level of the transmitted signal is decreased. Since the radiation is caused by current I, a reduction in current level leads to a reduction in emitted radiation.

Thus, the inductors raise the impedance of the power lines, thereby allowing the transfer of power to the lines at a higher voltage and a lower current, than what is required if the inductors were not employed.

DETAILED DESCRIPTION OF THE INVENTION

Figure 1:
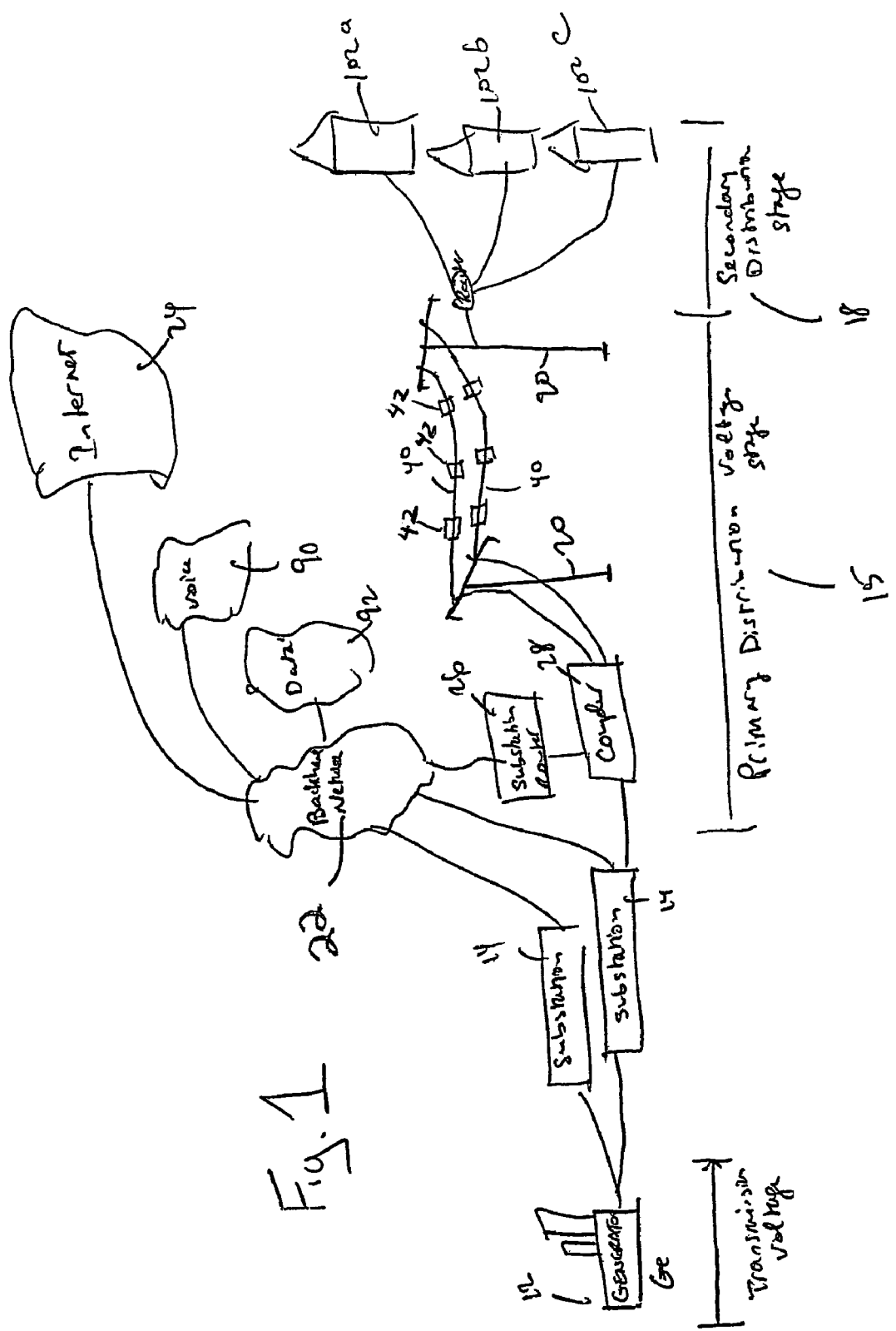
FIG. 1 illustrates a system that allows transmission of broadband signals over power lines in accordance with one embodiment of the invention.

FIG. 1 illustrates an electric distribution arrangement that is employed to carry high frequency communication signals. Typically, a generator station 12 provides transmission voltage signals to substations 14. At a primary distribution phase 15, substations 16 are in turn coupled to electric poles 20, for directing a power line 18 towards end users. At a secondary distribution phase 18 the voltage signal is stepped down, for transmitting power to end user homes and offices.

A backhaul network 22 is coupled to an Internet network 24 from one end and to the electric distribution system on the other end. Backhaul network 22 is coupled to a substation router 26, which in turn is coupled to a utility line via a coupler 28. As such, backhaul network 22 provides Internet communication signals to the transmission lines, and ultimately to end user's 102 electric outlets. It is noted that the invention is not limited in scope in that respect and other signals such as those generated within voice networks 90 and other types of data networks 92 can be injected into the utility lines.

Figure 2:
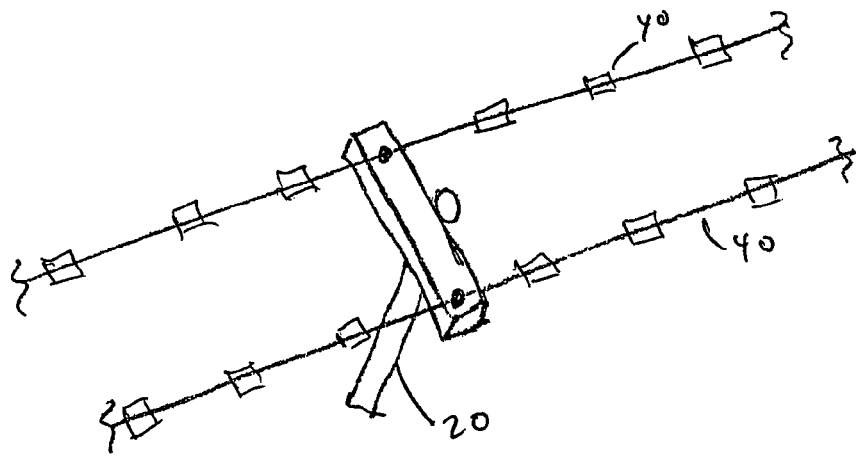
FIG. 2 illustrates a portion of a transmission line illustrated in FIG. 1, in accordance with one embodiment of the present invention.

FIG. 2 illustrates an electric pole 20 with a portion of the utility lines extending therefrom in accordance with one embodiment of the invention. As illustrated each utility line 40 contains a plurality of inductors 42 disposed at selected intervals along their length. Inductors 42 may be disposed at regular intervals, or may be disposed at irregular intervals depending on various requirements in each circumstance.

The use of inductors substantially eliminate the radiation emitted by the utility line 40 when carrying a high frequency HF communication signal. This follows, because the power, in general and signal power specifically, is characterized by ExI Wherein E is the voltage level and I, is the current level of the signal. Therefore, by raising the voltage level and reducing the current level by a like amount, the power is preserved, but the radiation, which is proportional to the current, is reduced.

Utility line 40 has a characteristic impedance, $Z_0$, which determines the ration of the voltage to current within line 40. By raising $Z_0$ the current that properly feeds the lines is reduced, while the required voltage is increased.

The characteristic impedance of a lossless transmission line is equal to $$Z_0 \sqrt{L/C}$$

Where L and C are respectively the inductance and capacitance, per unit length. The capacitance of the utility line is primarily determined by the distance between the conductors. This distance is determined by the requirements for AC power distribution, and cannot be changed. Thus, the inductance is one variable, which may be changed in accordance to various embodiments of the present invention.

Since it is desired to increase the impedance $Z_0$, it is necessary to increase the inductance per unit length. This is accomplished by installing at regular or irregular distances lumped inductances on the power line.

In accordance with one embodiment of the invention, the inductors are chosen so that their reactance is negligible at the power line frequency, which is typically 50–60 Hz, and significant in the high frequency (HF) band. For example, an inductance of 1 μHenry has a reactance of well below a milliohm at 60 Hz, but at 6 MHz it has a reactance of about 38 ohms.

In accordance with various embodiments of the invention, the exact value of the inductors has be selected based on the actual characteristics of the power line. For example the overall inductance L of the power line can be derived from the equation $$\frac{L}{d} \sum \frac{L}{d} \ln \frac{D}{a}$$

where μ is permiability, D is the space between the two wires, a is the radius of the conductors and d is the unit length. As such the intrinsic inductance per unit length may be calculated. From this information and the length of the power line, the tolerable increase in overall inductance L may be calculated based on an acceptable voltage drop of the AC utility power delivery. Furthermore, the economies of the placement of the lumped inductors may be determined, such that the overall desired increase in impedance L is balanced against the cost and effect on AC power convergence.

Figure 3:
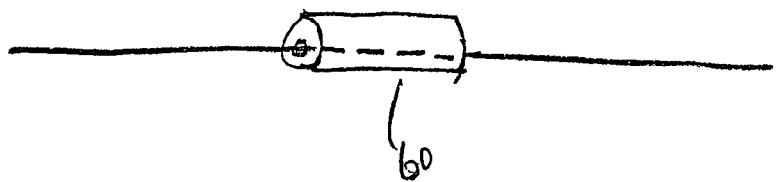
FIG. 3 illustrates a lumped inductor coupled in series with the transmission line of FIG. 2, in accordance with one embodiment of the present invention.

FIG. 3 illustrates an exemplary inductor 60 disposed along a power line 40 in accordance with one embodiment of the invention. Inductor 60 is a ferrite bead lumped inductor, which is coupled along the power line in a clamped arrangement. For this embodiment, the clamped inductors are positioned at desired intervals along the power line.

Figure 4:
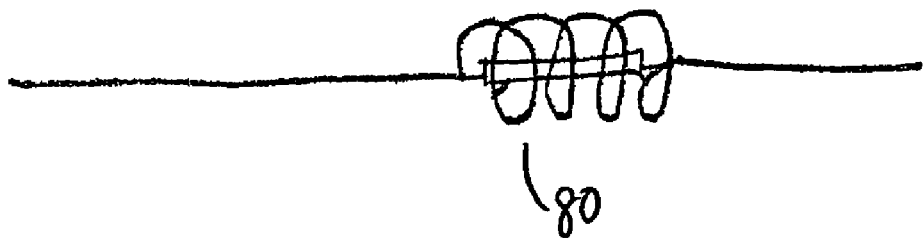
FIG. 4 illustrates a clamped-on inductor coupled with the transmission line of FIG. 2 in accordance with another embodiment of the present invention.

FIG. 4 illustrates an exemplary inductor 80 disposed along power line 40 in accordance with another embodiment of the invention. Inductor 80 is a series inserted inductor, located at desired locations along the power line.

Thus, in accordance to various embodiments of the invention, it is possible to reduce the radiation emitted from the transmission lines that carry high frequency communication signals. This is accomplished by first determining the voltage signal level and the current signal level of the signal transmitted via the transmission line. Thereafter, the lumped inductors are added to the power line at desired intervals. These intervals may or may not be regular. Thereafter, the system increases the voltage signal level, as the current signal level is decreased in substantially the same amount, due to the addition of the inductors and the resultant increase in the overall power line inductance. As a result of the decreased current signal level, the radiation emitted from the power line also decreases.

I claim:

1. A method for decreasing high frequency (HF) radiation emission from a power line spanning a plurality of utility poles or towers, said method comprising the steps of:
   transmitting a utility power signal over said power line;
   transmitting a high frequency communication signal over said power line so as to provide a combined utility and high frequency signal over said power line; and
   providing a plurality of inductors disposed along a span of said power line, between each of said poles or towers, such that said high frequency radiation emission from said power line generated by said high frequency communication signal is reduced along said span of said power line where said inductors are maintained.

2. The method in accordance with claim 1 further comprising the step of increasing a voltage level of said combined signal corresponding to an increased impedance in said power line as a result of said step of providing a plurality of inductors.

3. The method in accordance with claim 2, wherein said step of providing a plurality of inductors further comprises the step of providing said plurality of inductors at regular intervals.

4. The method in accordance with claim 2, wherein said step of providing a plurality of inductors further comprises the step of providing said plurality of inductors at irregular intervals.

5. The method in accordance with claim 2, wherein said step of providing a plurality of inductors further comprises the step of providing a plurality of clamped inductors.

6. The method in accordance with claim 2, wherein said step of providing a plurality of inductors further comprises the step of providing a plurality of series inserted inductors.

7. A system for decreasing high frequency (HF) radiation emission from a power line spanning a plurality of utility poles or towers, comprising:
   a first transmitter configured to transmit a utility power signal over said power line;
   a second transmitter configured to transmit a high frequency communication signal over said power line so as to provide a combined utility and high frequency signal over said power line; and
   a plurality of inductors disposed along said power line, between each of said poles or towers, such that said high frequency radiation emission from said power line generated by said high frequency communication signal is reduced along said span of said power line where said inductors are maintained.

8. The system in accordance with claim 7 further comprising means for increasing a voltage level of said combined signal corresponding to an increased impedance in said power line as a result of said plurality of inductors.

9. The system in accordance with claim 7, wherein said plurality of inductors are located at regular intervals.

10. The system in accordance with claim 7, said plurality of inductors are located at irregular intervals.

11. The system in accordance with claim 7, wherein at least one of said inductors is a clamped inductor.

12. The system in accordance with claim 7, wherein at least one of said plurality of inductors is a series inserted inductor.

* * * * *